US010554897B2

(12) United States Patent
Mathur et al.

(10) Patent No.: US 10,554,897 B2
(45) Date of Patent: Feb. 4, 2020

(54) METHOD AND SYSTEM FOR ADJUSTING THE FIELD OF VIEW OF A FLAME DETECTOR

(71) Applicant: Honeywell International Inc., Morris Plains, NJ (US)

(72) Inventors: Abhishek Mathur, Bangalore (IN); Michael Weinstein, Lincolnshire, IL (US); Sateesh Kumar Nukala, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/767,943

(22) PCT Filed: Oct. 16, 2015

(86) PCT No.: PCT/US2015/056055
§ 371 (c)(1),
(2) Date: Apr. 12, 2018

(87) PCT Pub. No.: WO2017/065808
PCT Pub. Date: Apr. 20, 2017

(65) Prior Publication Data
US 2018/0316867 A1 Nov. 1, 2018

(51) Int. Cl.
*H04N 5/232* (2006.01)
*G08B 17/12* (2006.01)
*H04N 5/445* (2011.01)
*G06K 9/00* (2006.01)

(52) U.S. Cl.
CPC ....... *H04N 5/23296* (2013.01); *G08B 17/125* (2013.01); *H04N 5/23206* (2013.01); *H04N 5/44504* (2013.01); *G06K 9/00771* (2013.01)

(58) Field of Classification Search
CPC .......................... G08B 17/125; H04N 5/23296
See application file for complete search history.

(56) References Cited

U.S. PATENT DOCUMENTS

2009/0315722 A1 12/2009 Hou
2011/0058037 A1 3/2011 Hanses et al.
(Continued)

FOREIGN PATENT DOCUMENTS

CN 102376156 A 3/2012
CN 102016944 4/2013
(Continued)

OTHER PUBLICATIONS

International Application No. PCT/US2015/056055, International Search Report, dated Jul. 21, 2016, 4 pages.
(Continued)

*Primary Examiner* — Thai Q Tran
*Assistant Examiner* — Girumsew Wendmagegn
(74) *Attorney, Agent, or Firm* — Alston & Bird LLP

(57) ABSTRACT

A device comprises a flame detector, a camera, a mounting device, and a network connection device. The camera has a first field of view that overlaps a second field of view of the flame detector. The mounting device comprises one or more motors to change the first field of view and the second field of view, and the network connection device is configured to provide communication between an output of the flame detector, an output of the camera, and a remote device.

15 Claims, 6 Drawing Sheets

(56) References Cited

U.S. PATENT DOCUMENTS

| | | | |
|---|---|---|---|
| 2012/0001760 A1 | 1/2012 | Harchanko | |
| 2015/0077614 A1 | 3/2015 | King | |
| 2016/0156880 A1* | 6/2016 | Teich | H04N 5/225 348/82 |

FOREIGN PATENT DOCUMENTS

| | | |
|---|---|---|
| CN | 103098106 | 5/2013 |
| DE | 102008001383 A1 | 10/2009 |
| DE | 102008001391 A1 | 10/2009 |
| WO | 2017065808 A1 | 4/2017 |

OTHER PUBLICATIONS

International Application No. PCT/US2015/056055, Written Opinion of the International Searching Authority, dated Jul. 21, 2016, 6 pages.

International Application No. PCT/US2015/056055, International Preliminary Report on Patentability of the International Searching Authority, dated Apr. 17, 2018, 7 pages.

DET-TRONICS xWatch® Industrial Video Surveillance Camera, 2015, http://www.det-tronics.com/ProductCatalog/FlameDetection/Pages/xWatchCamera.aspx#actions, downloaded from the Internet on Jul. 20, 2018, 2 pages.

Det-Tronics, Flame Applications and Products, Jan. 10, 2015, https://web.archive.org/web/20150110044955/http://www.det-tronics.com/ProductCatalog/FlameDetection/Pages/FlameProductsOverview.aspx, downloaded from the Internet on Jul. 20, 2018, 4 pages.

SPECTREX CCTV IR3 Flame Detector 20/20CTINS & 20/20CTIPS, Sep. 15, 2015, https://web.archive.org/web/20150915054149/http://spectrex-inc.com:80/products/sharpeye/2020cti, downloaded from the Internet on Jul. 20, 2018, 3 pages.

Europe Patent Application No. 15790738.7, Communication pursuant to Rules 161(1) and 162 EPC, dated Jul. 6, 2018, 3 pages.

Office Action for Chinese Application No. 201580085374.0 dated Jun. 11, 2019.

* cited by examiner

METHOD AND SYSTEM FOR ADJUSTING THE FIELD OF VIEW OF A FLAME DETECTOR

CROSS-REFERENCE TO RELATED APPLICATIONS

The present application claims priority to and is the National Stage of International Application No. PCT/US2015/056055, filed Oct. 16, 2015 and entitled "Method And System For Adjusting The Field Of View Of A Flame Detector," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Flame detectors can be used to identify combustion sources within an environment. When a flame detector detects a heat source within the environment, an alarm can be triggered to indicate the presence of a flame. However, various heat sources may not represent fire hazards and may simply be sources of radiant energy that do not represent a safety hazard. These sources may be present in the field of view of a flame detector, and they may be difficult to detect until after the flame detector has been installed. Since flame detectors do not generally produce a visual output, adjustment of the flame detectors to avoid these areas can be difficult.

SUMMARY

In an embodiment, a device comprises a flame detector, a camera, a mounting device, and a network connection device. The camera has a first field of view that overlaps a second field of view of the flame detector. The mounting device comprises one or more motors to change the first field of view and the second field of view, and the network connection device is configured to provide communication between an output of the flame detector, an output of the camera, and a remote device. The camera can be configured to obtain still images, video images, or both. The one or more motors can be configured to provide a pan and tilt movement to the camera and the flame detector. The network connection device can comprise a wireless communication interface, and/or the network connection device can comprise a router providing a wired or wireless connection with the remote device. The camera and the flame detector can be disposed in a fixed relationship with respect to each other, and the camera and the flame detector can be adjustable relative to the mounting device.

In an embodiment, an adjustment system for a flame detector, the adjustment system comprises a flame detector, a camera coupled to the flame detector, and a mobile device. The flame detector and camera are moveably mounted on a mounting device. The mobile device comprises a transceiver, a processor, and a memory. An adjustment application is stored in the memory that, when executed upon the processor, configures the processor to: receive an image of the environment from the camera, determine a field of view of the flame detector based on an offset of the flame detector from the camera, display an indicator of the field of view of the flame detector overlaid on the image, receive an input to adjust the field of view of the flame detector, generate a movement signal, send the movement signal to the mounting device, receiving a second image from the camera after being repositioned, and displaying the second image with the indicator of the field of view of the flame detector overlaid on the second image. The flame detector and the camera are repositioned relative to the mounting device in response to the movement signal. The system can also include a second transceiver coupled to the camera that can be configured to provide wireless communication between the camera and the mobile device. The system can also include a plurality of motors configured to move the flame detector and the camera relative to the mounting device, where the plurality of motors can be configured to actuate in response to the movement signal. The offset can comprise a distance between a center of the flame detector to the center of a lens of the camera, and the adjustment application can determine the field of view of the flame detector based the offset, a zoom factor of the camera, a zoom factor of the flame detector, and/or a sensitivity of the flame detector. The mounting device can comprise a second memory, a second processor, and a flame detection application stored in the second memory that, when executed upon the second processor, configures the second processor to: receive a signal from the flame detector, determine when a flame is present in the environment, and generate an alarm when a flame is detected in the environment. The flame detection application can further configure the second processor to: capture a third image with the camera in response to determining that the flame is present in the environment, and store the third image in the second memory.

In an embodiment, a method of adjusting the field of view of a flame detector comprises receiving, from a camera, an image of an environment, determining a field of view of a flame detector based on a position of the flame detector relative to the camera, displaying the image of the environment with the field of view of the flame detector overlaid on the image, receiving an input to adjust the field of view of the flame detector, sending a movement signal to a mounting device, where the field of view of the flame detector is repositioned in response to the movement signal, and displaying the image of the environment with the repositioned field of view of the flame detector overlaid on the image. The camera can be arranged in a fixed relationship with respect to the flame detector, and the camera can be repositioned with the flame detector. The image of the environment with the repositioned field of view of the flame detector can be a repositioned image based on the repositioning of the camera. The image of the environment can be received wirelessly from the camera. The movement signal can comprise motor movement information, and the flame detector and the camera can be repositioned in response to the movement of one or more motors in response to the movement signal. The method can also include detecting a heat source in the image of the environment within the field of view of the flame detector, where the input to adjust the field of view of the flame detector positions the heat source outside of the field of view of the flame detector. The method can also include detecting, by the flame detector, a flame in the environment within the field of view of the flame detector, and recording at least one of a still image or a video image with the camera in response to detecting the flame. Determining the field of view of the flame detector can be based on a distance between a center of the flame detector to the center of a lens of the camera.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
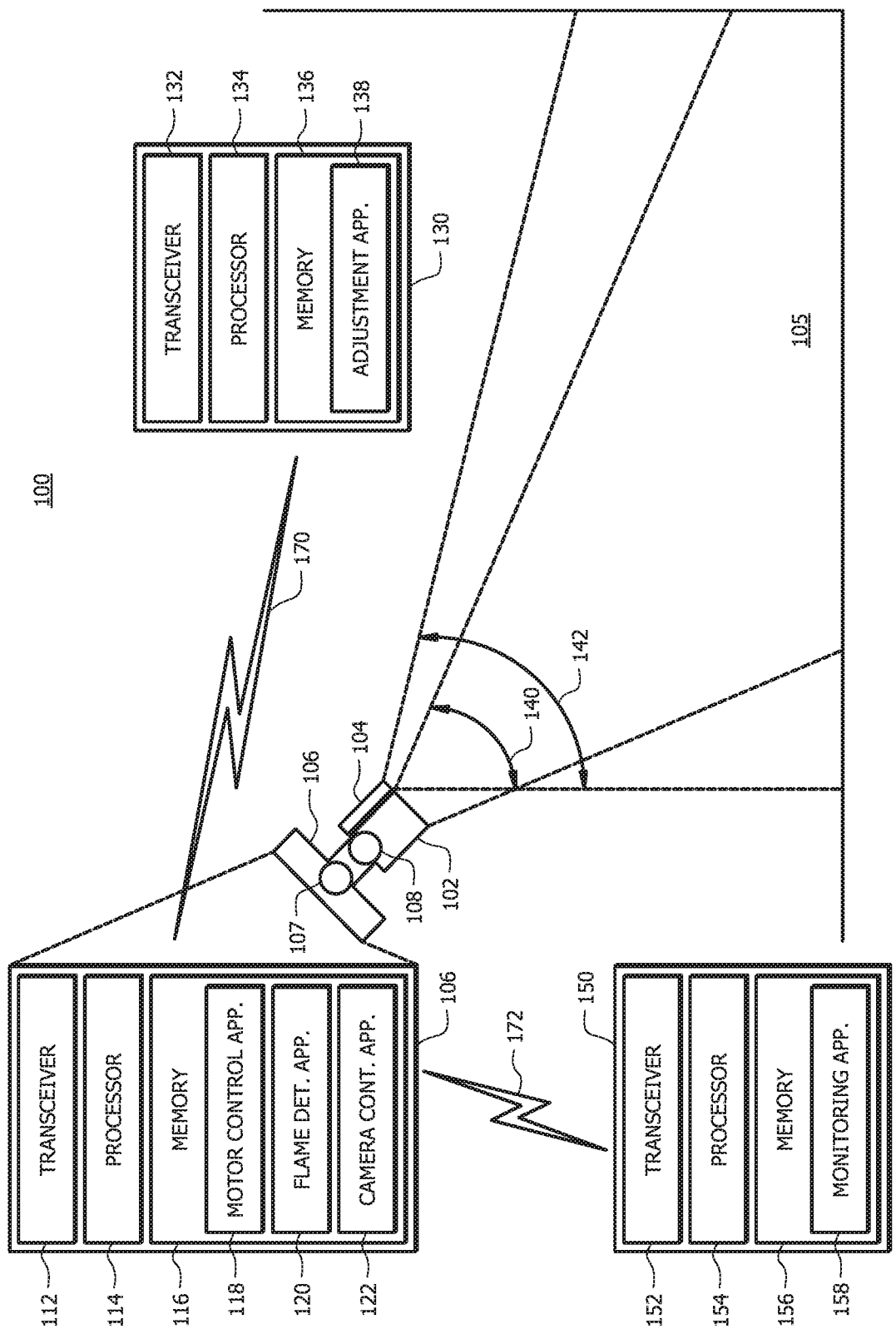
FIG. 1 schematically illustrates a system for adjusting a field of view of a flame detector according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Disclosed herein is an adjustment system and method for adjusting a flame detector's field of view. In general, flame detectors do not produce a visual signal, and the resulting field of view of the flame detector may be difficult to determine through simple inspection in the field. The field of view of the flame detector can be conical in shape and may be difficult to visualize without the proper tools. As a result, flame detectors can be improperly installed so that obstructions are present in the field of view. The resulting blind spots may create safety concerns in high risk areas. Further, the flame detectors can be installed above the normal reach of an operator, which may make it difficult to adjust a flame detector even if the obstruction is discovered.

In order to visualize the field of view of the flame detector, the present system uses a camera mounted with the flame detector to provide a view from the perspective of the flame detector. The camera can be linked over a communication channel to a portable or mobile device to provide a view that is similar to that of the flame detector. For example, an application can be used on a mobile device to receive and display an image from the camera mounted with the flame detector. In order to properly visualize the field of view of the flame detector, the application may determine the corresponding field of view of the flame detector and present an indication such as an overlay on the image from the camera. This may allow the operator to quickly see the field of view of the flame detector and adjust the flame detector to a desired position.

In order to allow the flame detectors that are installed out of reach of workers or operators to be adjusted, a mounting device can be used that is coupled to the flame detector and camera through a moveable motor mount. The mounting device can include a processor and memory to provide the ability to communicate with the application on the mobile device, control the motor mount, and send updates to the application. The mounting device may also provide an interface for the flame detector to change settings and other options.

This system can then be used to quickly commission or otherwise adjust the flame detector's field of view at a later time. In order to adjust the flame detector to remove a source of a false alarm (e.g., a reflecting surface, an opening for sunlight, etc.) from the field of view of the flame detector, the application can be used to access the camera and present an image of the environment from the camera. For example, a live feed can be provided from the camera to the application on the mobile device. Since the camera can be in a fixed position with respect to the flame detector, the relative field of view of the flame detector can be quickly calculated and presented as the overlay. The overlay representing the field of view of the flame detector can then be used to illustrate the flame detector's field of view, which can be adjusted using inputs provided to the application. The application may also allow the device settings for the flame detector to be changed. Various wireless connection standards such as Bluetooth or WiFi can be used to provide the connection between the camera/mounting device and the mobile device.

Once the flame detector has been adjusted, the camera can then be used to readjust the flame detector at a later time. The camera can also be used to capture images of the environment in the event of an alarm condition. The images may be used for compliance purposes. When a false alarm occurs, the camera can be used to capture images of the environment, identify the source of the false alarm, and then adjust the flame detector so that the source of the false alarm is removed from the field of view of the flame detector in the future. Thus, the system may be used at various points during the use of the flame detector to reduce the incidents of false alarms while capturing additional information when legitimate alarms occur.

FIG. 1 schematically illustrates a flame detection system 100 having an adjustment system. The flame detection system 100 generally comprises a flame detector 102, a camera 104, and a mounting device 106. The mounting device 106 can comprise a transceiver 112, a processor 114, and a memory 116. One or more applications can be stored in the memory 116 and execute upon the processor 114 to cause the processor 114 to perform certain functions. The flame detection system 100 can also comprise a mobile device 130 having a transceiver 132, a processor 134, and a memory 136. The memory 136 can comprise certain applications such as the adjustment application 138 that is configured to communicate with the mounting device 106 and allow for the flame detector 102 to be adjusted.

In some embodiments, the flame detection system 100 can also comprise a controller 150 that may serve as a facility control system for monitoring any warnings from the flame detector 102 and remotely contacting the mounting device 106. A plurality of network connections 170, 172 can be used to provide signal communication between the mounting device 106, the mobile device 130, and/or the controller 150.

The flame detector 102 serves to observe an area of an environment 105 and detect the presence of a flame. The flame detector 102 is generally configured to sense a flame using optical processing and/or detecting radiant energy within the field of view 140 to provide an indication that a flame is present in the field of view 140 within the environment 105. In an embodiment, the flame detector 102 can comprise a radiant energy sensor such as a photodiode, thermopile, pyro-electric, passive infrared sensor or other type of flame sensor to monitor the environment 105. The sensor can generate an electrical signal which corresponds to incident radiant energy or light. The light produced by a flaming fire may fluctuate, and the pattern can be used to identify the radiant energy source as a flame or fire. In some embodiments, a plurality of sensors can be present in the flame detector 102, and filter designed to allow certain wavelengths to pass through can be used to filter the radiant energy reaching the sensors.

The field of view 140 of the flame detector 102 can be determined by the design of the flame detector 102. Since the sensor in the flame detector 102 may not generate an optical image (e.g., a still image or video image), the field of view can be determined by calculating the expected field of view based on the position of the sensor and any lenses included in the flame detector 102. For example, a zoom factor of the lens may determine the field of view of the flame detector 102. The field of view may generally have a conical shape extending out from the flame detector 102, the parameters of which can be determined and stored in the flame detector as operational parameters or otherwise associated with a given make and model of the flame detector. The range of view of the flame detector 102 may be determined based, at least in part, on a sensitivity of the flame detector. The sensitivity may be a configurable parameter where the higher the sensitivity, the longer the distance or range at which the flame detector 102 can detect a source of a flame.

The camera 104 serves to provide a still or video image of the environment 105 and provide the image of the environment 105 to the mobile device 130 and/or the controller 150. Any suitable camera that is configured to capture an image of the environment 105 and provide the image to the mounting device 106 through a wired or wireless connection can be used. In an embodiment, the camera is an optical camera that provides images in the visual light range. The image may allow an operator to see the environment 105 under the ambient conditions in real time or near real time. As used herein, near real-time refers to a time that may take into account a latency of the system and any communication delays, which may be within about 1 second, within about 5 seconds, within about 10 seconds, or within about 30 seconds.

Figure 2:
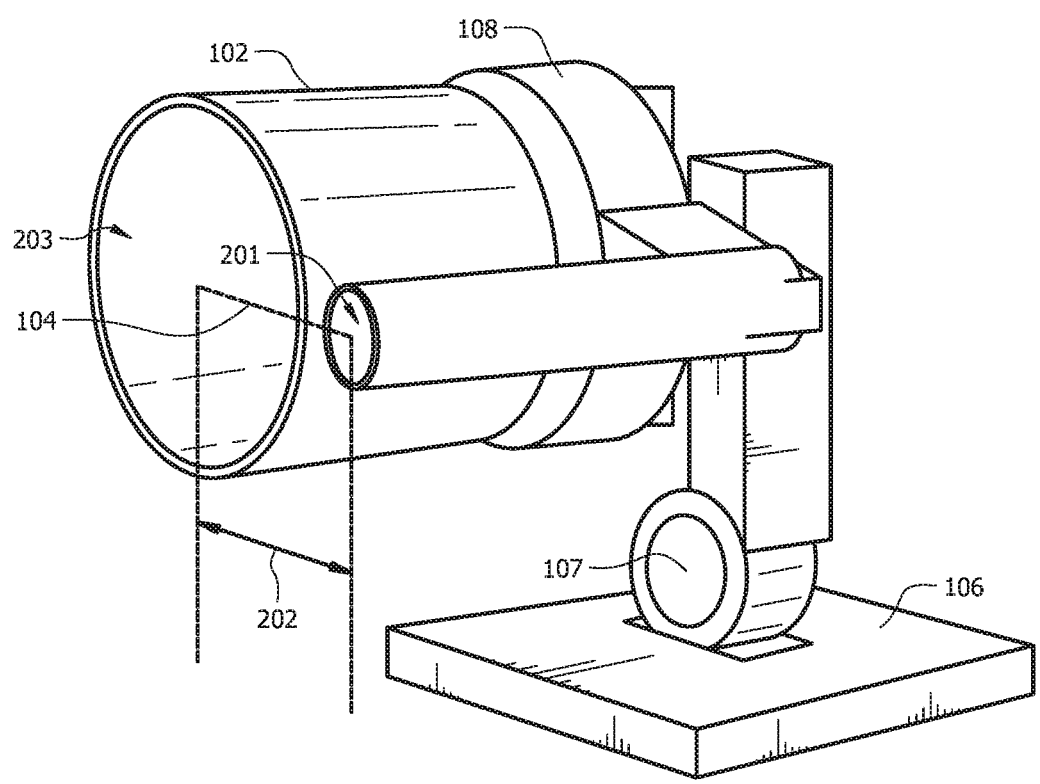
FIG. 2 illustrates an embodiment of a flame detector and camera coupled to a mounting device.

Referring to FIG. 1 and FIG. 2, the center 201 of the camera 104 is offset from the center 203 of the flame detector 102. The resulting offset distance 202 can be defined as the distance 202 between the center 203 of the flame detector 102 and the center 201 of a lens of the camera 104. The field of view can generally be affected by the focal length of the corresponding lens and the size of the image sensor or flame sensor. In order to provide a view of the environment 105 with the field of view 140 of the flame detector 102 illustrated, the field of view 142 of the camera 104 can be larger (e.g., having a wider viewing angle) than the field of view 140 of the flame detector 102 when taking the offset distance 202 into account. In some embodiments, the camera 104 can comprise a variable power lens to allow the image to be zoomed in and out, while in other embodiments, the camera 104 may comprise a fixed power lens. If a variable power lens is used with the camera 104, the narrowest field of view (e.g., the highest focal length) can provide a field of view 142 that overlaps with the field of view 140 of the flame detector 102.

The camera 104 can be positioned in the same housing as the flame detector 102 or the camera 104 can be separate from the flame detector 102. In an embodiment, the flame detector 102 and the camera 104 can be mounted in a fixed relationship to each other. This may allow the camera 104 and the flame detector 102 to move relative to the mounting device 106 while retaining a fixed spatial relationship relative to each other.

The camera 104 and the flame detector 102 can be moveably mounted with respect to the mounting device 106 in order to allow the flame detector 102 to be adjusted. In order to allow the flame detector 102 and/or the camera 104 to be adjusted, one or more motors can be used to provide various degrees of motion of the flame detector 102 and/or camera 104 relative to the mounting device 106. In an embodiment, two motors 107, 108 may be used to provide pan (e.g., rotation about a first axis such as vertical axis) and tilt (e.g., rotation about a second axis that is perpendicular to the first axis such as a horizontal axis) motions of the flame detector 102 and the camera 104 relative to the mounting device 106. The combination of the two motors 107, 108 may then allow the portion of the environment 105 within the field of view 140 of the flame detector 102 to be adjusted during use. While described as having two motors 107, 108, one motor, or more than two motors can be used to provide the same relative motions. Further, while described as having a pan and tilt motions, a third axis of motion (e.g., a rotation about a third axis perpendicular to the first and second axes) can be included to allow for a full range of motion of the flame detector 102 and/or the camera 104 relative to the mounting device 106.

The mounting device 106 can generally comprise any suitable structure configured to couple the flame detector 102 and the camera 104 to a structure to allow the flame detector 102 and the camera 104 to view the environment 105. In addition to supporting the flame detector 102 and the camera 104, the mounting device 106 may also comprise the transceiver 112, the processor 114, and the memory 116. The transceiver 112 can allow the mounting device 106 to communicate with the mobile device 130 and/or the controller 150 through a wired or wireless communication signal.

In addition to having the radio transceiver 112 to exchange transmissions with the mobile device 130 and/or the controller 150 for wireless data communications, the mounting device 106 also may contain hardware and software providing WiFi functionality that may be used in connection with mounting device 106 exchanging images and instructions with the mobile device 130. Alternatively or in addition to WiFi technology, the mounting device 106 may contain other hardware and software associated with other wireless local area network technologies that may observe the IEEE (Institute of Electrical and Electronics Engineers) 802.11 set of standards (e.g., using Bluetooth protocols, etc.). In some embodiments, the connection between the mounting device 106 and the controller 150 and/or the mobile device 130 can comprise a wired connection.

The memory 116 of the mounting device 106 can comprise one or more applications to provide for various functions of the mounting device 106. The motor control application 118 can configure the processor 114 to control the motors 107, 108 in response to various movement signals received at the mounting device 106. In an embodiment, the motor control application 118 may receive movement signals from the mobile device 130 during the adjustment of the flame detector 102 and control the motors to move to a predefined position, thereby repositioning the flame detector 102 and/or the camera 104.

The flame detection application 120 may execute on the processor 114 and configure the processor 114 to detect a flame in the environment 105 within the field of view 140 of the flame detector 102. The flame detection application 120 can receive an indication of radiant energy from one or more sensors in the flame detector 102 and/or images from the camera 104. The output of the sensor and/or camera 104 can be used to match potential flame patterns and determine if a flame is present in the environment. In general, a flame may be expected to fluctuate over time as opposed to a relatively uniform heat source. Various algorithms are present to avoid false alarms resulting from heat sources in the environment 105. When a flame is detected, the flame detection application 120 may generate an alarm indicating the presence of the flame in the environment 105. In some embodiments, the flame detection application 120 may send a notification and alarm to the monitoring application 158 in the controller 150, as described in more detail herein. In some embodiments, the flame detection application 120 may send a false alarm notification and/or an alarm notification to the flame detector 102. The flame detector 102 can then decide, on the basis of input from flame detection application 120 and its own algorithms, whether the source is a flame or a false alarm source and can then raise the alarm or no alarm accordingly. In some embodiments, the flame detection application 120 may be a part of the flame detector 102 and operate on an independent processor in the flame detector 102. In still other embodiments, the flame detection application 120 or a similar application may be present as part of both the mounting device 106 and the flame detector 102.

The camera control application 122 may execute on the processor 114 and configure the processor 114 to detect the image of the environment 105. The camera control application 122 can interact with the adjustment application 138 on the mobile device 130 during the adjustment process. For example, the camera control application 122 may receive instructions from the adjustment application 138, obtain the image of the environment 105, and transmit the image to the mobile device 130. The camera control application 122 may also serve to interact with the flame detection application 120 and record one or more images if a flame is detected by the flame detector 102, as described in more detail herein.

The mobile device 130 may serve to provide for a mobile adjustment system for the flame detector 102 once the flame detector 102 is installed in the environment 105. In general, flame detectors can be mounted above the average reach of an operator in a facility in order to have a view of the environment 105. This mounting location may make physical access to the flame detector 102 impractical both during the installation process and at any point during use. For example, if a potential flame source or potential source of false alarms are created in the environment 105, the flame detector 102 may need to be adjusted. The mobile device 130 may then be used to wirelessly communicate with the mounting device 106 and adjust the flame detector 102 without the need to physically access the flame detector.

In some embodiments, the mobile device 130 can comprise a mobile telephone, a media player, a personal digital assistant (PDA), a tablet computer, a laptop computer, or the like. The mobile device 130 can comprise a transceiver 132 configured to provide wireless communication with another device such as the transceiver 112 in the mounting device 106. As with the transceiver 112 in the mounting device 106, the mobile device 130 may comprise circuitry and software to provide WiFi technology and/or other hardware and software associated with other wireless local area network technologies that may observe the IEEE (Institute of Electrical and Electronics Engineers) 802.11 set of standards (e.g., using Bluetooth protocols, etc.).

The memory 136 of the mobile device 130 can comprise the adjustment application 138 that can configure the processor 134 to perform an adjustment of the flame detector 102. In an embodiment, the adjustment application 138, when executed, can be configured to establish a connection between the mobile device 130 and the mounting device 106. For example, the wireless transceivers can be used to establish a wireless communication channel for information to be sent between the mobile device 130 and the mounting device 106. Once the wireless connection is established, the adjustment application 138 may send a request to the mounting device 106 to obtain an image of the environment 105. In an embodiment, the request may interact with or initiate the camera control application 122 in the mounting device 106. In response to the request for the image, the camera control application 122 may obtain an image from the camera 104 and send the image back to the mobile device 130. The image can comprise a still image of the environment or a video image of the environment 105 provided at any of a variety of frame rates and quality. When a still image is sent, it may be updated upon request, at a regular period (e.g., once a second, once a minute, etc.), or in response to a change in the image.

The adjustment application 138 may receive the image from the camera 104. For example, the adjustment application 138 may receive the image from the camera control application 122 executing on the mounting device 106. The adjustment application 138 may then determine a field of view 140 of the flame detector 102. As described herein, the field of view 140 of the flame detector 102 can be based on the focal length of the flame detector 102. This information may be known by the adjustment application 122. For example, the model number of the flame detector 102 may be known to the adjustment application 138, or this information may be sent by the camera control application 122 at any point during the wireless connection setup or thereafter (e.g., with the image, etc.).

The field of view 142 of the camera 104 may also be determined by the adjustment application 138, which can be based on the focal length of the camera 104. In order to determine the relative positioning of the field of view of the flame detector 102 with respect to the camera 104, the relative position of each sensor may be used. The relative position information can include both the offset distance and the relative spatial relationship between the center of the camera 104 and the center of the flame detector 102 (e.g., an angular alignment relative to vertical, offset coordinates, etc.). The relative position information may be input into the system during installation and setup, or the information may be known from the model of the camera 104 and the flame detector 102. In some embodiments, the relative positioning information may be stored in the mounting device 106 (e.g., in the memory 116) and transmitted to the adjustment application 138.

The relative positioning of the field of view 140 of the flame detector 102 and the field of view 142 of the camera 104 can then be determined. In an embodiment, a geometric solution to find the overlapping portions of the field of views 140, 142 can be used based on the relative positioning of the camera 104 and the flame detector 102. The solution can be determined in the mounting device 106 and/or in the mobile device 130. For example, the relative field of view calculation may be determined in the mounting device during setup and stored in the memory 116. The overlapping field of view information can then be sent to the mobile device 130 with the image. Alternatively, the information for the flame detector 102 and the camera 104 can be sent to the mobile device 130, and the determination of the overlapping field of views can be determined on the mobile device 130.

Figure 3:
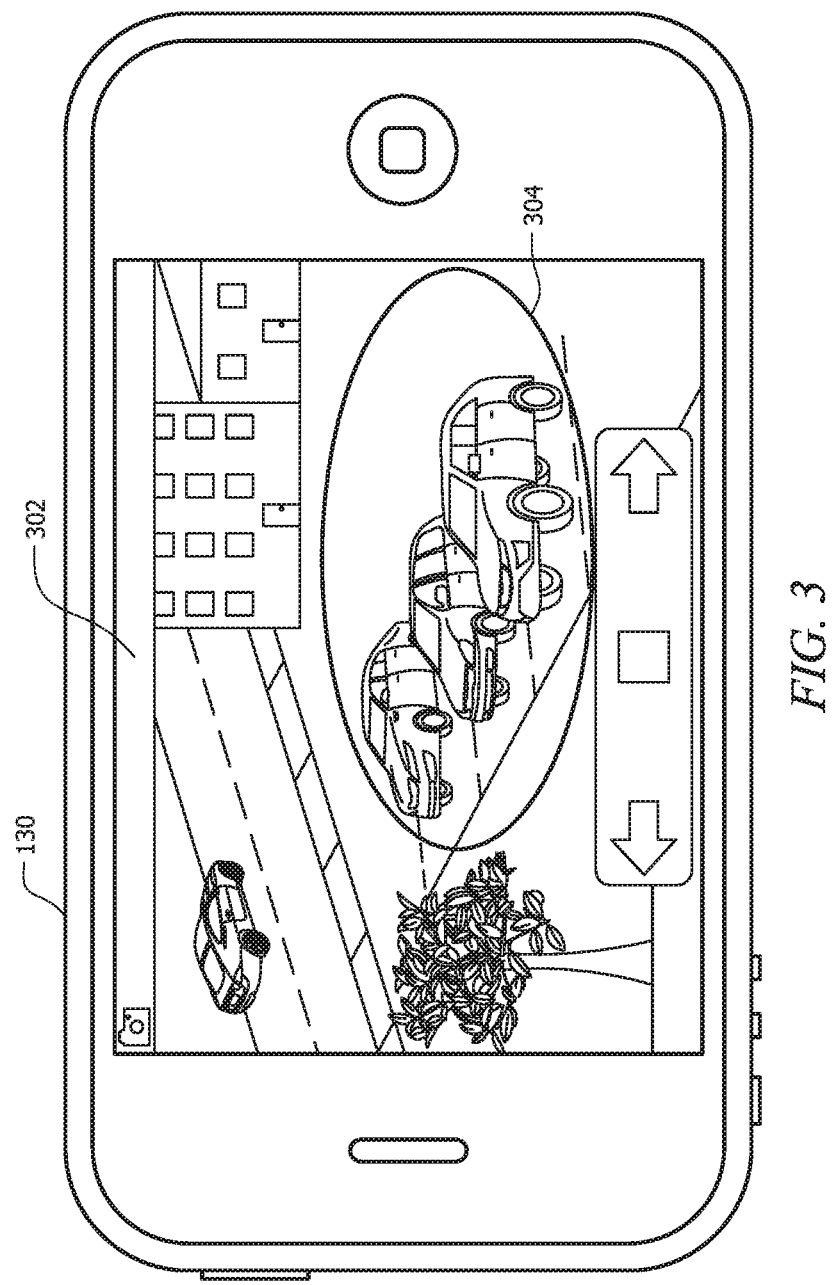
FIG. 3 illustrates an embodiment of a screen shot on a mobile device.

Once the relevant overlap information is determined, the image can be shown in a display associated with the mobile device. FIG. 3 schematically illustrates a display 302 on an embodiment of the mobile device 130. The image of the environment may be displayed on all or a portion of the display 302. The determined field of view 140 of the flame detector 102 can then be presented as an overlay 304 on the image of the display 302. The overlay 304 can be presented as an outline, a transparent marking, or other indicator. The overlay 304 may allow the area of the image within the field of view 140 to be identified on the display 302.

The overlay 304 on the image may allow various items within the field of view 140 of the flame detector 102 to be identified. For example, various obstructions, source of false alarms, or the like can be identified. The obstructions can include items in the environment 105 that may block the view of the flame detector 102 to a desired location. For example, various building elements such as walls, beams, equipment, and the like can be identified in the image. Sources of false alarms can include various heat sources that may provide a heat signature similar to a flame. For example, reflections or glare from the sun at certain times of the day may provide a heat signature that is similar to a flame. Similarly, openings may provide direct sunlight to the flame detector at certain times of the year. For example, an opening may provide direct sunlight to the flame detector 102 during the winter that may not be discovered as a potential source for false alarms when the flame detector is installed in the summer. Additional sources such as the use of a lighter by workers in a smoking area may result in false alarms. The overlay may also allow the flame detector to be properly positioned on the potential area of concern in the environment 105. For example, if a flame detector 102 is used to cover an area with a flame hazard, the overlay may indicate if the field of view 140 of the flame detector 102 covers the area of interest. As new equipment is added, the field of view 140 of the flame detector 102 may also be adjusted.

When the overlay 304 indicates that the field of view 140 of the flame detector 102 should be adjusted, an operator may provide an input to the adjustment application 138. Various inputs such as directional controls, touch screen inputs, or the like can be used to indicate how the field of view 140 of the flame detector 102 should be adjusted. For example, the operator may drag the overlay 304 to a desired position, or a movement input (e.g., a selection of an arrow, etc.) may be used to indicate that the overlay 304 corresponding to the field of view 140 should be adjusted. The adjustment application 138 may convert the input into a movement signal. The movement signal may comprise positioning coordinates or motion inputs (e.g., motor step inputs, etc.) that can be used with the motors 107, 108 to adjust the flame detector. The movement signal can then be sent from the mobile device 130 to the mounting device 106 over the wireless connection.

In response to receiving the movement signal, the flame detector 102 can be repositioned relative to the mounting device 106 so that the field of view 140 of the flame detector 102 matches the desired input position. In an embodiment, the camera control application 122 may receive any movement signals and provide the outputs to the motors 107, 108 to cause the motors 107, 108 to reposition the flame detector 102 and/or the camera 104 to be repositioned relative to the mounting device in response to the movement signal. When the camera 104 is in a fixed relationship with the flame detector 102, both the camera 104 and the flame detector 102 can be repositioned at the same time.

Once the flame detector 102 is repositioned, the adjustment application 138 can receive a new image of the environment 105 from the camera 104. The image can be generated in response to the repositioning. For example, when the camera 104 is sending video images to the mobile device 130, the image may be updated based on any movements of the camera 104 as part of the video stream. In some embodiments, the adjustment application 138 may generate a request for the image.

When the new image is received by the adjustment application 138, the field of view 140 of the flame detector 102 can be redetermined and positioned on the image in the display 302. The new image with the overlay can then be used to determine if the field of view 140 of the flame detector 102 is in the appropriate position. If further adjustments are needed, the adjustment application 138 can repeat the adjustment process to refine and reposition the flame detector 102.

While described with respect to the flame detector 102 and the camera 104 having a fixed relative positioning, the camera 104 may be independent of the flame detector 102 in some embodiments. For example, the camera 104 may maintain a position while the flame detector 102 is adjusted. In this embodiment, the image from the camera 104 may be updated or remain the same while the position of the overlay 304 on the image may change in response to the change in the positioning of the flame detector 102.

Once the flame detector 102 has been adjusted, the flame detector 102 can be used to monitor the environment 105 within the field of view 140 for flames. During use, the flame detector 102 may be in signal communication with the controller 150 that may serve to monitor the flame detector 102 for alarms indicating the detection of a flame. In some embodiments, the flame detector 102 can be connected with the controller 150 through a wired or wireless connection. The controller 150 may be in signal communication with a plurality of detectors throughout a facility.

As shown in FIG. 1, the controller 150 can comprise a transceiver 152, a processor 154, and a memory 156. The transceiver 152 and/or other network communication equipment can be used to establish a connection 172 with the mounting device 106. In some embodiments, the network connection 172 may comprise a mesh network with at least one additional device relaying information between the mounting device 106 and the controller 150.

The monitoring application 158 may execute on the processor 154 and may configure the processor 154 to receive inputs from the flame detector 102 through the mounting device 106. The monitoring application 158 may generally receive inputs from the flame detector 102 that provide an indication of the status of the flame detector 102 in addition to any alarms triggered upon the detection of a flame in the field of view 140.

The monitoring application 158 may communicate with the flame detection application 120 and receive indications when a flame is detected. In some embodiments, the camera 104 may be used to record the environment 105 when an alarm is triggered. For example, the flame detection application 120 may be configured to initiate the camera 104 when the flame detector 102 detects a flame in the environment 105. The camera 104 can then record still images or video during the alarm for record keeping purposes. In some embodiments, the flame detection application 120 may initiate the camera 104 to record the environment and store the images in the memory 116. The images can then be sent to the monitoring application 158 in the controller 150 as a live feed or after the alarm is handled for a review cycle.

In some embodiments, an alarm signal can be generated by the flame detection application 120 and sent to the controller 150. The monitoring application 158 can then generate a recording signal to the mounting device 106 to activate the camera 104 and record the environment 105. While described as recording the environment 105 once an alarm is triggered, the flame detection application 120 can be configured to continuously record the environment with the camera. For example, a looped storage can be used to provide a looped recording for a predetermined time period. Upon the detection of a flame or any other alarm, the recording can be saved along with subsequent images in order to view the environment 105 before and after the triggering of the alarm.

In some embodiments, the images captured at the time of an alarm can be used to reposition the flame sensor 102. In this embodiment, the images can be reviewed, and the overlay representing the field of view 140 of the flame detector 102 can be optionally used to identify the source of the alarm trigger. When the alarm is determined to be a false alarm, the image with the optional overlay 304 can be used to reposition the flame detector 102 to avoid the source of the false alarm in the future. In this embodiment, the image with the optional overlay 304 can be used to generate movement signals that can be sent to the mounting device 106 to reposition the flame detector 102. This may be useful in identifying and avoiding sources of false alarms that can arise during use that are difficult to identify at the time of installation and setup of the flame detector 102.

While described in the context of using the mobile device 130 with a wireless connection with the mounting device 106, in some embodiments, the adjustment application 138 can be incorporated into the controller 150. For example, the image and the corresponding field of view 140 of the flame detector 102 can be sent to the controller 150 and displayed on a display such as monitor in a control room. The controller 150 can then be used to remotely adjust the field of view 140 of the flame detector 102 in addition to other flame detectors present at a facility.

In use, the system 100 can be used in a process to adjust the field of view of a flame detector. Referring to FIGS. 1-3, the method can begin by receiving an image of the environment from a camera 104. The camera 104 can be disposed in a fixed relationship with respect to the flame detector 102, though both the camera 104 and the flame detector 102 can move relative to the mounting device 106, and therefore, the environment 105. For example, the camera 104 and the flame detector 102 can share a common housing or individual housings can be coupled together. In an embodiment, the camera 104 can send the image wirelessly from the camera 104 to the mobile device 130 through the transceiver 112 in the mounting device 106.

The field of view of the flame detector 102 can then be determined based on the position of the flame detector 102 with respect to the camera 104. For example, the field of view of the flame detector can be determined based on a distance between the center of the flame detector to the center of a lens of the optical camera. The relative angle and the associated design of the camera 104 and the flame detector 102 may also be taken into account in determining the field of view 140 of the flame detector 102 relative to the field of view 142 of the camera 104.

The image of the environment 105 can then be displayed with the relative positioning of the field of view 140 of the flame detector 102 presented as an overlay 302 on the image. The overlay 302 may be compared to the image to identify any potential issues with the positioning of the flame detector 102. For example, a source of false alarms may be identified and the field of view 140 can be adjusted to avoid future false alarms. In some embodiments, the field of view can be adjusted to capture a desired monitoring area.

When an adjustment is identified, an input can be provided to the mobile device 130 indicating the desired adjustment to the field of view 140 of the flame detector 102. In response to receiving the input, the mobile device 130 can generate a movement signal indicating a degree of movement for the flame detector 102. The movement signal can be sent to the mounting device 106 to reposition the flame detector 102. In response to receiving the movement signal, one or more motors 107, 108 associated with the mounting device 106 can be activated to reposition the flame detector 102.

Once the flame detector 102 has been repositioned, a new image of the environment 105 can be obtained. In some embodiments, the camera 104 may be repositioned with the flame detector 102, and the new image may represent a new view from the repositioned camera 104. The image can be sent to the mobile device 130 where it can be displayed. The field of view 140 can be represented on the display 302 by the overlay. This process can be repeated any number of times in order to properly align the field of view 140 of the flame detector 102 with a desired monitoring area in the environment 105.

In some embodiments, the flame detector 102 can then be used to monitor the environment 105 for the presence of a flame or heat source. When a heat source is detected by the flame detector 102, the camera 104 can be used to record an image or images of the environment 105. The images can include still images or video images. The images can be recorded for use in identifying the source of the flame in the environment 105. If the source of the flame in the environment 105 is determined to be a source of a false alarm, the adjustment process can be repeated to avoid the source of the false alarm in the future.

Figure 4:
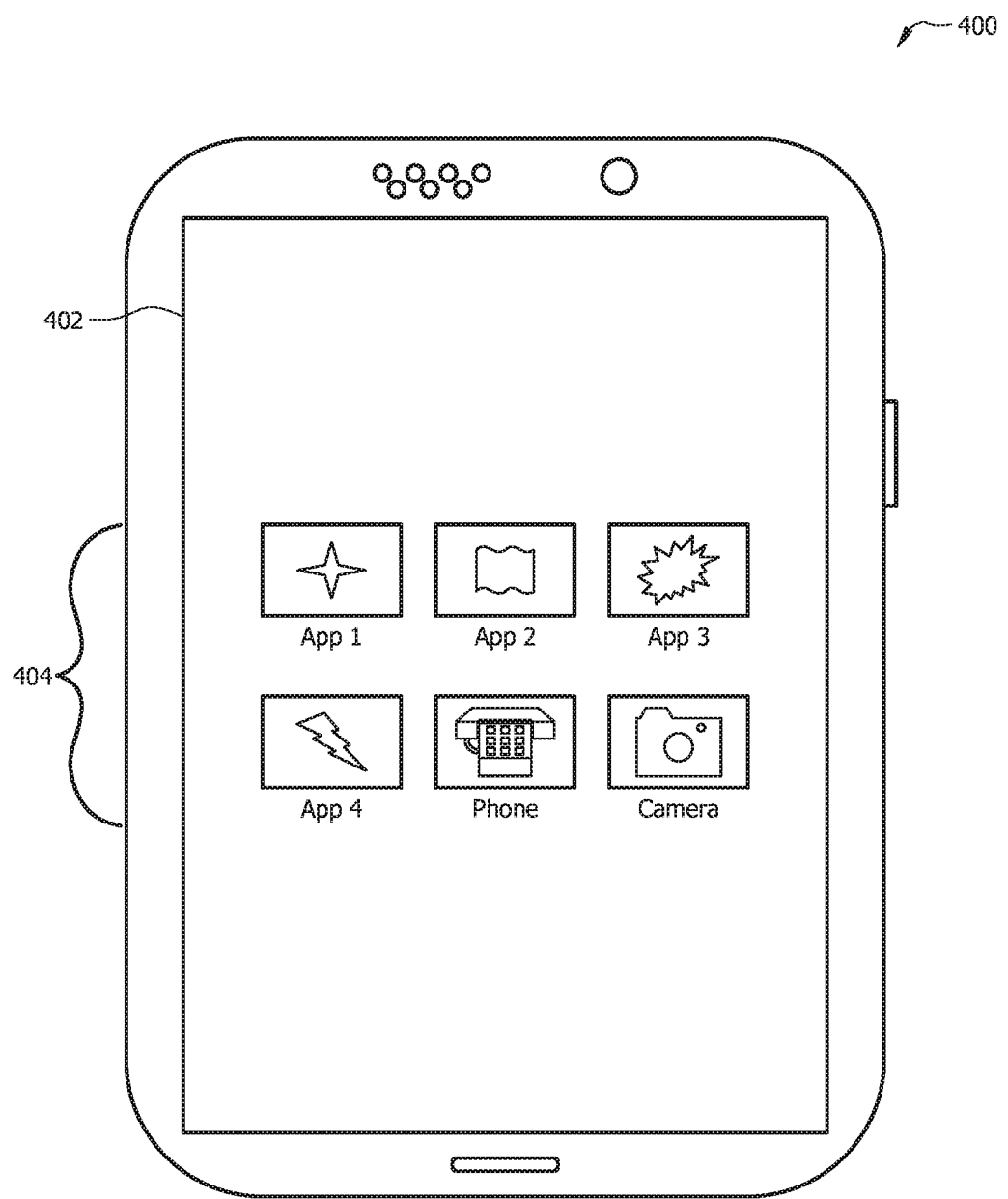
FIG. 4 is an illustration of a handset according to an embodiment of the disclosure.

FIG. 4 depicts a mobile device 400, which is operable for implementing aspects of the present disclosure, but the present disclosure should not be limited to these implementations. In an embodiment, the mobile device 130 of FIG. 1 may be the same or similar to the mobile device 400. Though illustrated as a mobile phone, the mobile device 400 may take various forms including a wireless handset, a pager, a personal digital assistant (PDA), a gaming device, a media player, a tablet, a tablet computer, or a wireless enabled computer. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
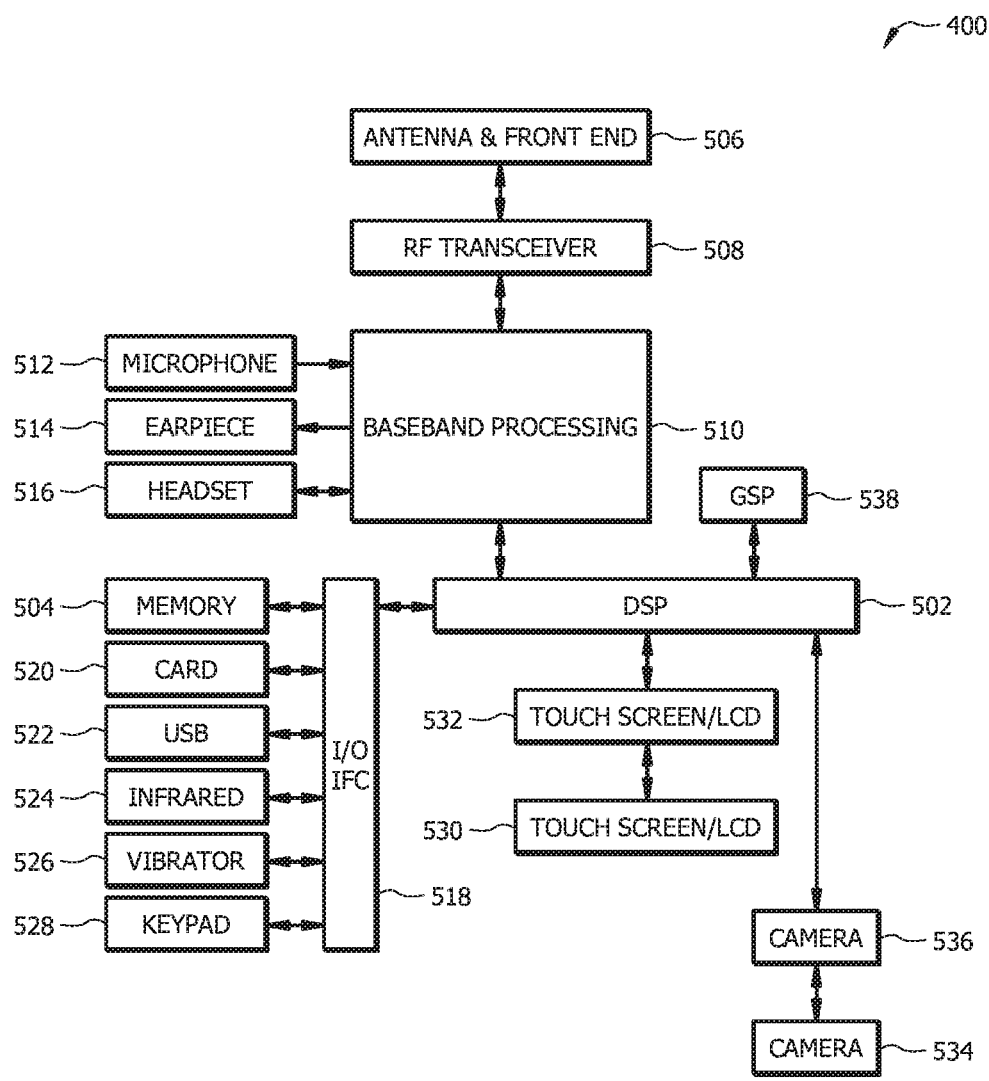
FIG. 5 is a block diagram of a hardware architecture of a handset according to an embodiment of the disclosure.

FIG. 5 shows a block diagram of the mobile device 400. In an embodiment, the mobile device 130 of FIG. 1 may be a mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
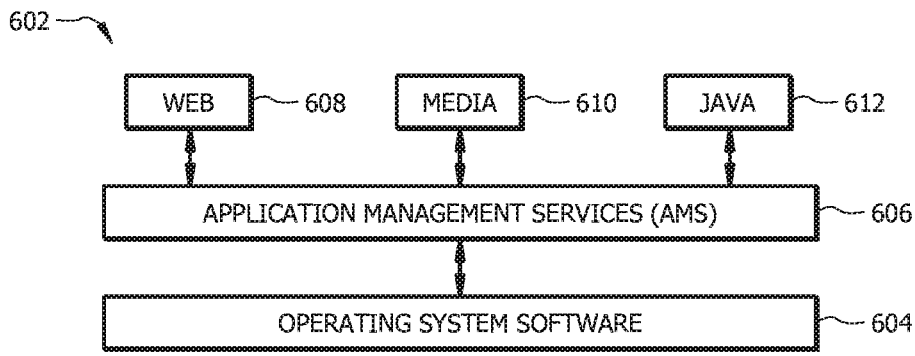
FIG. 6A is block diagram of a software architecture of a handset according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
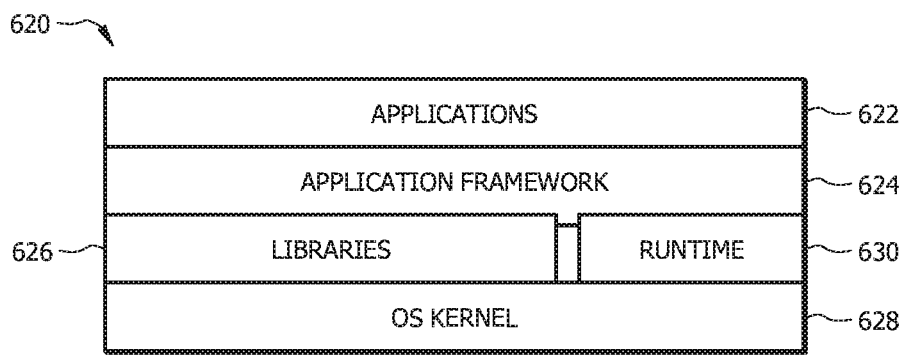
FIG. 6B is a block diagram of another software architecture of a handset according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
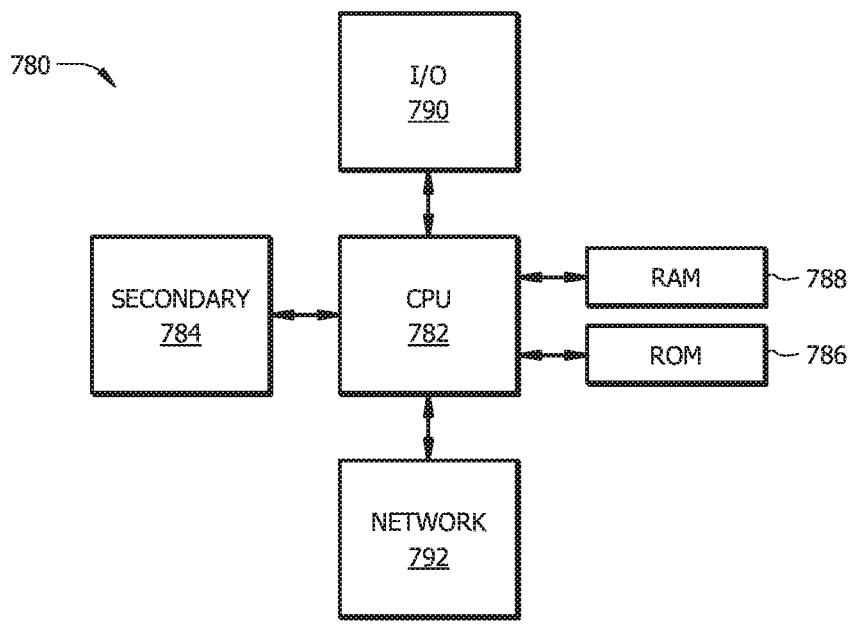
FIG. 7 is a block diagram of a computer system according to an embodiment of the disclosure.

As described herein, the mounting device 106, the mobile device 130, and/or the controller 150 can each operate as a computer with a corresponding processor and memory. FIG. 7 illustrates a computer system 780 suitable for implementing one or more embodiments disclosed herein, including any of the mounting device 106, the mobile device 130, and/or the controller 150. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An adjustment system for a flame detector, the adjustment system comprising:
    a flame detector;
    a camera coupled to the flame detector, wherein the flame detector and camera are moveably mounted on a mounting device;
    a mobile device, wherein the mobile device comprises a transceiver, a processor, and a memory, wherein an adjustment application is stored in the memory that, when executed upon the processor, configures the processor to:
    receive an image of the environment from the camera;
    determine a field of view of the flame detector based on an offset of the flame detector from the camera;
    display an indicator of the field of view of the flame detector overlaid on the image;
    receive an input to adjust the field of view of the flame detector;
    generate a movement signal;
    send the movement signal to the mounting device, wherein the flame detector and the camera a repositioned relative to the mounting device in response to the movement signal;
    receiving a second image from the camera after being repositioned; and
    displaying the second image with the indicator of the field of view of the flame detector overlaid on the second image.

2. The device of claim 1, wherein the camera and the flame detector are disposed in a fixed relationship with respect to each other, and wherein the camera and the flame detector are adjustable relative to the mounting device.

3. The adjustment system of claim 1, further comprising a second transceiver coupled to the camera, wherein the second transceiver is configured to provide wireless communication between the camera and the mobile device.

4. The adjustment system of claim 1, further comprising a plurality of motors configured to move the flame detector and the camera relative to the mounting device, wherein the plurality of motors are configured to actuate in response to the movement signal.

5. The adjustment system of claim 1, where the offset comprises a distance between a center of the flame detector to the center of a lens of the camera, and wherein the adjustment application determines the field of view of the flame detector based the offset, a zoom factor of the camera, and a zoom factor of the flame detector.

6. The adjustment system of claim 1, wherein the mounting device comprises a second memory, a second processor, and a flame detection application stored in the second memory that, when executed upon the second processor, configures the second processor to receive a signal from the flame detector; determine then a flame is present in the environment; and generate an alarm when a flame is detected in the environment.

7. The adjustment system of claim 6, wherein the flame detection application further configures the second processor to capture a third image with the camera in response to determining that the flame is present in the environment; and store the third image in the second memory.

8. A method of adjusting the field of view of a flame detector, the method comprising;
    receiving, from a camera, an image of an environment;
    determining a field of view of a flame detector based on an offset of the flame detector from the camera;
    displaying the image of the environment with the field of view of the flame detector overlaid on the image;
    receiving an input to adjust the field of view of the flame detector;
    sending a movement signal to a mounting device, wherein the field of view of the flame detector is repositioned relative to the mounting device in response to the movement signal; and
    displaying the image of the environment with the repositioned field of view of the flame detector overlaid on the image.

9. The method of claim 8, wherein the camera is arranged in a fixed relationship with respect to the flame detector, and wherein the camera is repositioned with the flame detector.

10. The method of claim 9, wherein the image of the environment with the repositioned field of view of the flame detector is a repositioned image based on the repositioning of the camera.

11. The method of claim 8, wherein the image of the environment is received wirelessly from the camera.

12. The method of claim 8, wherein the movement signal comprises motor movement information, and wherein the flame detector and the camera are repositioned in response to the movement of one or more motors in response to the movement signal.

13. The method of claim 8, further comprising detecting a heat source in the image of the environment within the field of view of the flame detector, wherein the input to adjust the field of view of the flame detector positions the heat source outside of the field of view of the flame detector.

14. The method of claim 8, further comprising:
    detecting, by the flame detector, a flame in the environment within the field of view of the flame detector;
    recording at least one of a still image or a video image with the camera in response to detecting the flame.

15. The method of claim 8, wherein determining the field of view of the flame detector is based on a distance between a center of the flame detector to the center of a lens of the camera.

* * * * *